United States Patent
Chuang

(10) Patent No.: US 8,886,971 B2
(45) Date of Patent: Nov. 11, 2014

(54) ELECTRONIC DEVICE, STORAGE MEDIUM AND METHOD FOR PROTECTING THE ELECTRONIC DEVICE

(75) Inventor: Yueh-Cheng Chuang, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 174 days.

(21) Appl. No.: 13/459,125

(22) Filed: Apr. 28, 2012

(65) Prior Publication Data

US 2013/0151870 A1  Jun. 13, 2013

(51) Int. Cl.
*G05F 1/00* (2006.01)

(52) U.S. Cl.
USPC .......................................................... 713/300

(58) Field of Classification Search
CPC ............................... H02H 5/083; H01H 35/42
USPC .......................................................... 713/300
See application file for complete search history.

(56) References Cited

U.S. PATENT DOCUMENTS

| | | | | |
|---|---|---|---|---|
| 5,428,347 A * | 6/1995 | Barron | ........................... | 340/604 |
| 6,633,986 B1 * | 10/2003 | Sellers | ........................... | 713/300 |
| 6,683,535 B1 * | 1/2004 | Utke | ........................... | 340/604 |
| 2005/0267698 A1 * | 12/2005 | Gordon | ........................... | 702/64 |
| 2006/0208914 A1 * | 9/2006 | Liu et al. | ........................... | 340/620 |
| 2010/0033883 A1 * | 2/2010 | Simon | ........................... | 361/52 |

OTHER PUBLICATIONS

L*F*A, Can early 2011 MBP detect liquid & preventatively shut down?, Aug. 17, 2011, http://www.mac-forums.com/forums/apple-notebooks/247945-can-early-2011-mbp-detect-liquid-preventatively-shut-down.html.*
Tanenbaum Andrew S., Structured Computer Organization, 1984, Prentice-Hall Inc., 2nd ed., pp. 10-12.*

* cited by examiner

*Primary Examiner* — Mark Connolly
(74) *Attorney, Agent, or Firm* — Novak Druce Connolly Bove + Quigg LLP

(57) ABSTRACT

In a method for protecting an electronic device, a voltage threshold value is set for indicating that water has entered the electronic device. A voltage value is detected from each water sensor included in the electronic device at a predetermined time interval. The method determines whether water has entered the electronic device according to the detected voltage value of water sensor and the voltage threshold value. When water has entered the electronic device, the method further prompts a user of the electronic device using a predetermined prompt mode, and controls the electronic device to be powered-off.

12 Claims, 4 Drawing Sheets

ELECTRONIC DEVICE, STORAGE MEDIUM AND METHOD FOR PROTECTING THE ELECTRONIC DEVICE

BACKGROUND

1. Technical Field

Embodiments of the present disclosure relate to protection systems and electronic devices, and more particularly to an electronic device, a storage medium and a method for protecting the electronic device.

2. Description of Related Art

Most electronic devices are not waterproofed. If an electronic device is accidentally dropped in a pool of water, the electronic circuitry may short-circuit if the electronic device is on. If the electronic device is turned-off when dropped into the water and the user of the electronic device does not realize that water seeped into the electronic device, a short circuit may still occur if the user powers the electronic device on. Therefore, there is room for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 1:
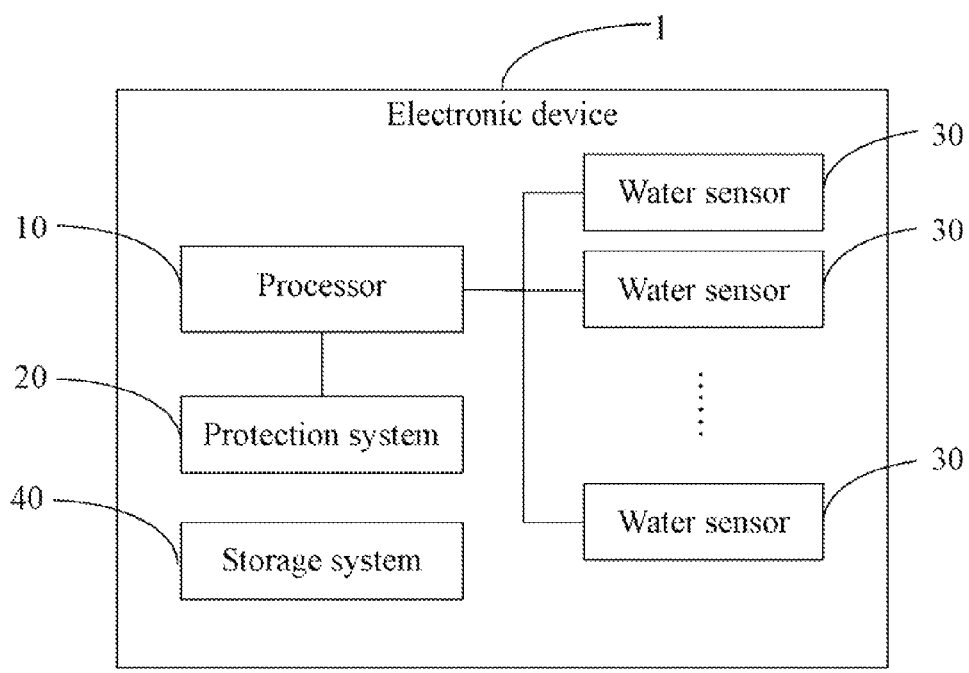
FIG. 1 is a block diagram of one embodiment of an electronic device including a protection system.

FIG. 1 is a block diagram of one embodiment of an electronic device 1 including a protection system 20. The electronic device 1 further includes a plurality of water sensors 30. Each of the water sensors 30 is arranged around an area of the electronic device 1 that may be easily entered with water, that is, the area of the electronic device 1 is susceptible to water seepage or leakage. For example, the area of one water sensor may be at a Universal Serial Bus (USB) port of the electronic device 1, at an earphone jack of the electronic device 1, or at a microphone jack of the electronic device 1. In one embodiment, the number of the water sensors 30 and the areas of the water sensors 30 can be set according to the structure of the electronic device 1. The protection system 20 detects whether water has entered the electronic device, prompts a user of the electronic device 1 when water has entered the electronic device 1, and controls the electronic device 1 to be powered-off for protecting the electronic device 1 from damage.

The electronic device 1 further includes a processor 10 and a storage system 40. The processor 10 executes one or more computerized codes and other applications for the electronic device 1, to provide the functions of the protection system 20. The storage system 40 may be a memory, an external storage card, such as a smart media card, or a secure digital card.

Figure 2:
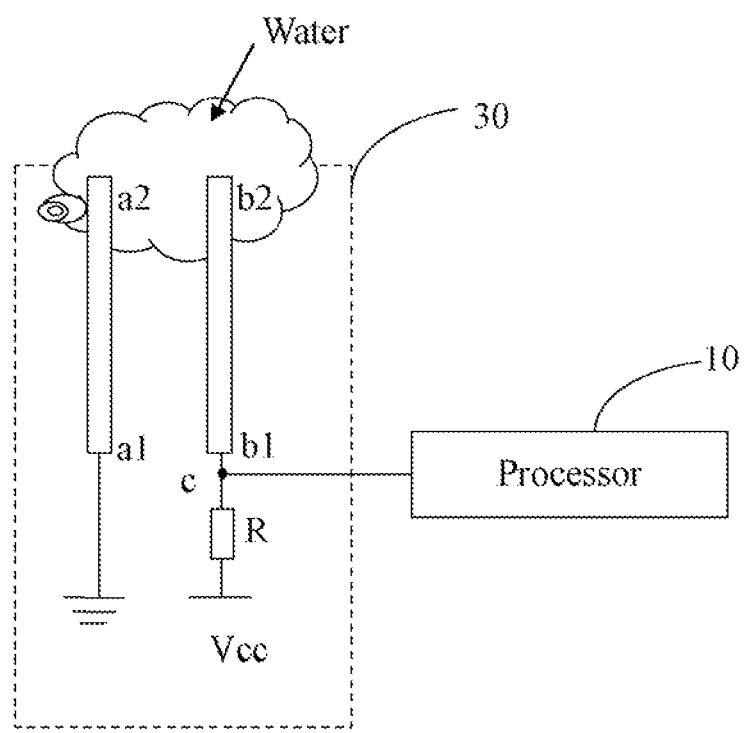
FIG. 2 is a schematic diagram of a water sensor in the electronic device of FIG. 1.

FIG. 2 is a schematic diagram of one of the water sensors 30 included in the electronic device 1. In one embodiment, each of the water sensors 30 is an integrated circuit (IC) chipset, which can sense whether water has entered the electronic device 1 through the areas of the water sensors 30. Referring to FIG. 2, each of the water sensors 30 includes a first copper sheet (referred to the first copper sheet "a") and a second copper sheet (referred to the second copper sheet "b"). The first copper sheet "a" includes a first node (denoted as the first node "a1") and a second node (denoted as the first node "a2"). The second copper sheet "b" includes a third node (denoted as the third node "b1") and a fourth node (denoted as the fourth node "b2"). The first node "a1" may connect to a low potential node of the electronic device 1 (e.g. a cathode of a battery of the electronic device 1). The third node "b1" may connect to a power supply of the electronic device 1 (e.g. Vcc of the electronic device 1) through a resistor (denoted as the resistor "R"). The second node "a2" and the fourth node "b2" are floating, and can be connected through the water (e.g. short-circuited by the water, the water acts as conductor) for making the first copper sheet "a" connect to the second copper sheet "b". If water has not entered the electronic device 1, the first copper sheet "a" disconnects from the second copper sheet "b". If water has entered the electronic device 1 and the second node "a2" connects the fourth node "b2" through the water, the first copper sheet "a" connects to the second copper sheet "b" and potential of each of the water sensors 30 may be changed.

In one embodiment, the processor 10 may obtain a voltage value of a test point (denoted as the test point "c") through a connection between the third node "b1" and the resistor "R" in each of the water sensors 30. If water has not entered the electronic device 1, the voltage value of the test point "c" may be not equal to 0 volt (0V) (e.g. remain at Vcc of the electronic device 1), since the second node "a2" disconnects to the fourth node "b2". If water has entered the electronic device 1, the voltage value of the test point "c" may be equal to be a low potential of the low potential node (e.g. the test point "c" is pulled to ground or close to ground depending on the amount of water), since the second node "a2" connects to the fourth node "b2" through water.

Figure 3:
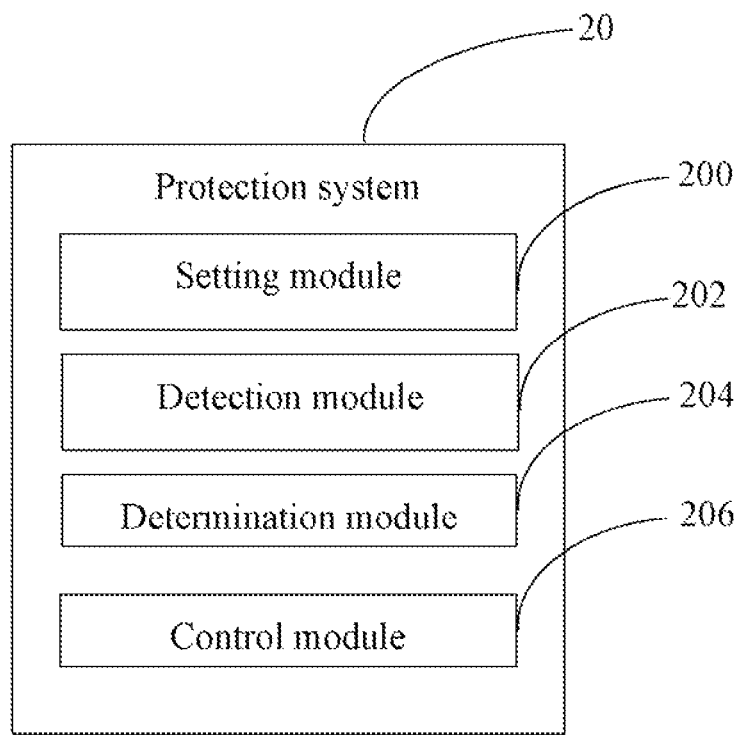
FIG. 3 is a block diagram of function modules of the protection system in the electronic device of FIG. 1.

FIG. 3 is a block diagram of function modules of the protection system 20 in the electronic device 1 of FIG. 1. In one embodiment, the protection system 20 may include a setting module 200, a detection module 202, a determination module 204, and a control module 206. The modules 200, 202, 204, and 206 comprise computerized codes in the form of one or more programs that are stored in the storage system 40. The computerized code includes a plurality of instructions that are executed by the processor 10 to provide functions for the modules.

The setting module 200 sets a voltage threshold value for indicating that water has entered the electronic device 1, and stores the voltage threshold value into the storage system 40. In the embodiment, the voltage threshold value is set as a voltage value (e.g., 0V) of the test point "c" in one of the water sensors 30 when the second node "a2" connects to the fourth node "b2" through water.

The detection module 202 detects a voltage value of the test point "c" in each of the water sensors 30 at a predetermined time interval, such as one or two seconds.

The determination module 204 determines whether water has entered the electronic device 1 according to the voltage value of each of the water sensors 30 and the voltage threshold value. In one embodiment, if at least one voltage value of the test point "c" is equal to the voltage threshold value, the determination module 204 determines that water has entered the electronic device 1. If the voltage value of the each test point "c" is not equal to the voltage threshold value, the determination module 204 determines that water has not entered the electronic device 1.

The control module 206 prompts the user of the electronic device 1 using a predetermined prompt mode and controls the electronic device 1 to be powered-off, if the determination module 204 determines that water has entered the electronic device 1. In one embodiment, the prompt mode may be a phone ring mode or a voice message mode of the electronic device 1. For example, the control module 206 plays a voice message of "Attention, water has entered the electronic device". The control module 206 may send an interrupt signal to the processor 10 to power off the electronic device 1. Afterwards, the user of the electronic device 1 may check and repair the electronic device 1 from the water according to the prompt in time.

Figure 4:
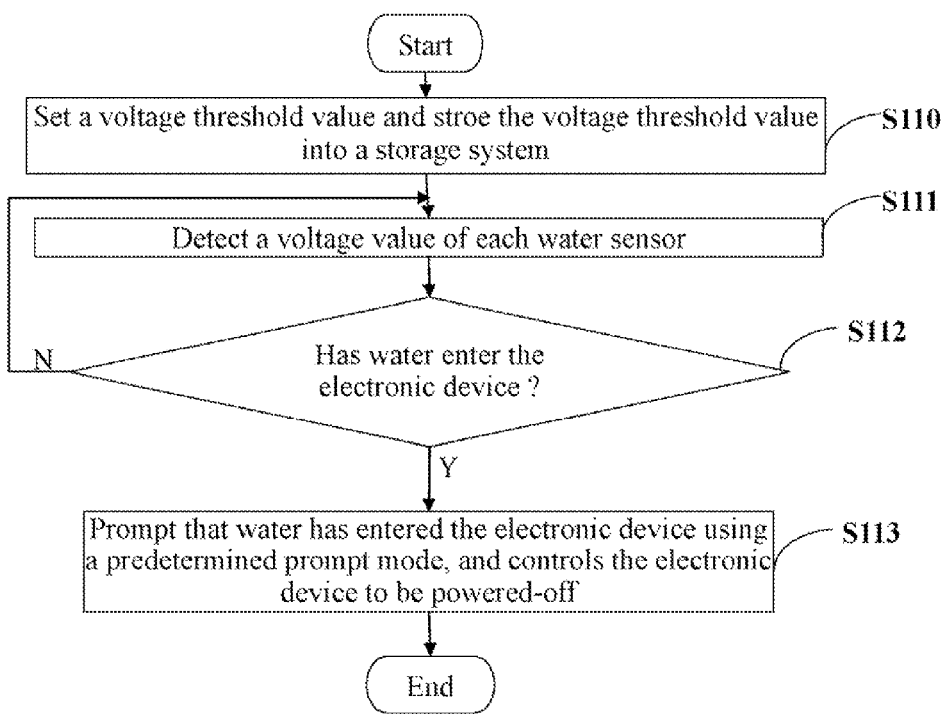
FIG. 4 is a flowchart of one embodiment of a method for protecting an electronic device using the system of FIG. 1.

FIG. 4 is a flowchart of one embodiment of a method for protecting an electronic device using the protection system 20 of FIG. 1. Depending on the embodiment, additional blocks may be added, others deleted, and the ordering of the blocks may be changed.

In block S110, the setting module 200 sets a voltage threshold value for indicating that water has entered the electronic device 1, and stores the voltage threshold value into the storage system 40. The voltage threshold value is set as a voltage value (e.g., 0 volts) of the test point "c" of one of the water sensors 30 when the second node "a2" connects to the fourth node "b2" through water.

In block S111, the detection module 202 detects a voltage value of the test point "c" in each of the water sensors 30 at a predetermined time interval, such as one or two seconds.

In block S112, the determination module 204 determines whether water has entered the electronic device 1 according to the voltage value of each of the water sensors 30 and the voltage threshold value. In one embodiment, if at least one voltage value of each test point "c" is equal to the voltage threshold value, the determination module 204 determines that water has entered the electronic device 1, and block S113 is implemented. If the voltage value of the each test point "c" is not equal to the voltage threshold value, the determination module 204 determines that water has not entered the electronic device 1, and block S111 is repeated.

In block S113, the control module 206 prompts the user of the electronic device 1 that water has entered the electronic device 1 using a predetermined prompt mode, and controls the electronic device 1 to be powered-off. In one embodiment, the prompt mode may be a phone ring mode or a voice message mode of the electronic device 1. The control module 206 may send an interrupt signal to the processor 10 to power off the electronic device 1. Afterwards, the user of the electronic device 1 may check and repair the electronic device 1 from the water according to the prompt in time.

All of the processes described above may be embodied in, and be fully automated via, functional code modules executed by one or more general-purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

The invention claimed is:

1. An electronic device, comprising:
   a plurality of sensors, each of the plurality of sensors being located at the electronic device to detect entered water, and each of the sensors comprising a first copper sheet having a first node that connects a low potential node of the electronic device and a second node that is floating, and a second copper sheet having a third node that connects a power supply node of the electronic device through a resistor and a fourth node that is floating;
   a storage system;
   at least one processor; and
   one or more programs that are stored in the storage system and executed by the at least one processor, the one or more programs comprising:
   a setting module that sets a voltage threshold value and stores the voltage threshold value into the storage system;
   a detection module that detects a voltage value sensed from each of the sensors at a predetermined time interval;
   a determination module that determines whether water has entered the electronic device according to the voltage value of each of the sensors and the voltage threshold value;
   a control module that prompts a user of the electronic device using a predetermined prompt mode and controls the electronic device to be powered-off when water has entered the electronic device.

2. The electronic device as claimed in claim 1, wherein the second node connects to the fourth node by the water when the water has entered the electronic device, and the voltage value of a test point between the third node and the resistor is changed to a low potential of the low potential node.

3. The electronic device as claimed in claim 1, wherein the determination module determines that the water has entered the electronic device if at least one voltage value of one of the plurality of sensors is equal to the voltage threshold value, or determines that the water has not entered the electronic device if the voltage value of each of the plurality of sensors is not equal to the voltage threshold value.

4. The electronic device as claimed in claim 1, wherein the prompt mode is a phone ring mode or a voice message mode of the electronic device.

5. A computer-implemented method for protecting an electronic device, the method comprising:
   setting a voltage threshold value and storing the voltage threshold value into a storage system of the electronic device;
   detecting a voltage value sensed from each sensor of the electronic device at a predetermined time interval, wherein each sensor being located at the electronic device to detect entered water, and each sensor comprising a first copper sheet having a first node that connects a low potential node of the electronic device and a second node that is floating, and a second copper sheet having a third node that connects a power supply node of the electronic device through a resistor and a fourth node that is floating;

determining whether water has entered the electronic device according to the voltage value of each sensor and the voltage threshold value; and prompting a user of the electronic device using a predetermined prompt mode and controlling the electronic device to be powered-off when water has entered the electronic device.

6. The method as claimed in claim 5, wherein the second node connects to the fourth node by the water when the water has entered the electronic device, and the voltage value of a test point between the third node and the resistor is changed to a low potential of the low potential node.

7. The method as claimed in claim 5, wherein the determining step comprises:

determining that the water has entered the electronic device if at least one voltage value of one sensor is equal to the voltage threshold value; and determining that the water has not entered the electronic device if the voltage value of each sensor is not equal to the voltage threshold value.

8. The method as claimed in claim 5, wherein the prompt mode is a phone ring mode or a voice message mode of the electronic device.

9. A non-transitory computer readable storage medium storing a set of instructions, when executed by at least one processor of an electronic device, cause the at least one processor to perform a method of protecting the electronic device, the method comprising:

setting a voltage threshold value and storing the voltage threshold value into a storage system of the electronic device;

detecting a voltage value sensed from each sensor of the electronic device at a predetermined time interval, wherein each sensor being located at the electronic device to detect entered water, and each sensor comprising a first copper sheet having a first node that connects a low potential node of the electronic device and a second node that is floating, and a second copper sheet having a third node that connects a power supply node of the electronic device through a resistor and a fourth node that is floating;

determining whether water has entered the electronic device according to the voltage value of each sensor and the voltage threshold value; and prompting a user of the electronic device using a predetermined prompt mode and controlling the electronic device to be powered-off when water has entered the electronic device.

10. The non-transitory computer readable storage medium as claimed in claim 9, wherein the determining step comprises:

determining that the water has entered the electronic device if at least one voltage value of one sensor is equal to the voltage threshold value; and determining that the water has not entered the electronic device if the voltage value of each sensor is not equal to the voltage threshold value.

11. The non-transitory computer readable storage medium as claimed in claim 9, wherein the second node connects to the fourth node by the water when water has entered the electronic device, and the voltage value of a test point between the third node and the resistor is changed to a low potential of the low potential node.

12. The non-transitory computer readable storage medium as claimed in claim 9, wherein the prompt mode is a phone ring mode or a voice message mode of the electronic device.

* * * * *